United States Patent [19]

Thorn

[11] Patent Number: 5,000,428
[45] Date of Patent: Mar. 19, 1991

[54] FLUID-DAMPED STRUT

[75] Inventor: Richard P. Thorn, Erie, Pa.

[73] Assignee: Lord Corporation, Erie, Pa.

[21] Appl. No.: 444,471

[22] Filed: Dec. 1, 1989

[51] Int. Cl.$^5$ ............................................. F16F 5/00
[52] U.S. Cl. .................................. 267/140.1; 180/312;
248/562; 248/636; 267/219
[58] Field of Search ................. 267/140.1 R, 140.1 A,
267/140.1 C, 293, 294, 141.1, 141.2, 219, 220;
248/562, 636; 180/300, 312, 902

[56] References Cited

U.S. PATENT DOCUMENTS

| | | | |
|---|---|---|---|
| 2,812,175 | 11/1957 | Hirst | 267/294 |
| 4,377,216 | 3/1983 | Ueno | 248/562 |
| 4,518,058 | 5/1985 | Fister | 180/300 |
| 4,679,779 | 7/1987 | Hodonsky | 267/140.1 |
| 4,706,946 | 11/1987 | Thorn et al. | 248/636 X |
| 4,779,853 | 10/1988 | Sugino et al. | 180/300 X |

FOREIGN PATENT DOCUMENTS

| | | | |
|---|---|---|---|
| 0192380 | 8/1986 | European Pat. Off. | |
| 43239 | 3/1984 | Japan | 267/140.1 R |
| 201136 | 10/1985 | Japan | 267/140.1 A |
| 130639 | 6/1986 | Japan | 267/140.1 A |
| 180036 | 8/1986 | Japan | 267/140.1 A |
| 274130 | 12/1986 | Japan | 248/562 |
| 15549 | 1/1989 | Japan | 267/140.1 A |

Primary Examiner—George E. Halvosa
Attorney, Agent, or Firm—Howson & Howson

[57] ABSTRACT

A fluid-filled strut particularly suited for automotive engine torque control applications. The strut includes a frame having a pair of fluid-filled chambers located adjacent opposite ends. Each chamber is defined by juxtaposed recesses in a pair of elastomeric blocks located on opposite sides of the frame. A discrete elongate fluid conduit connects opposite axial ends of each chamber. Attachment plates on opposite sides of the frame are bonded to the elastomeric blocks and are connected together by a connector bolt sleeve that extends across the frame through the fluid-filled chamber. The elastomeric blocks permit the frame to move in alternate axial directions relative to the sleeve, and in response to such motion, fluid in the chamber is displaced in alternate directions through the conduit to effect the desired motion damping. The elastomeric blocks are shaped to provide a desirable controlled snubbing action in both directions.

14 Claims, 2 Drawing Sheets

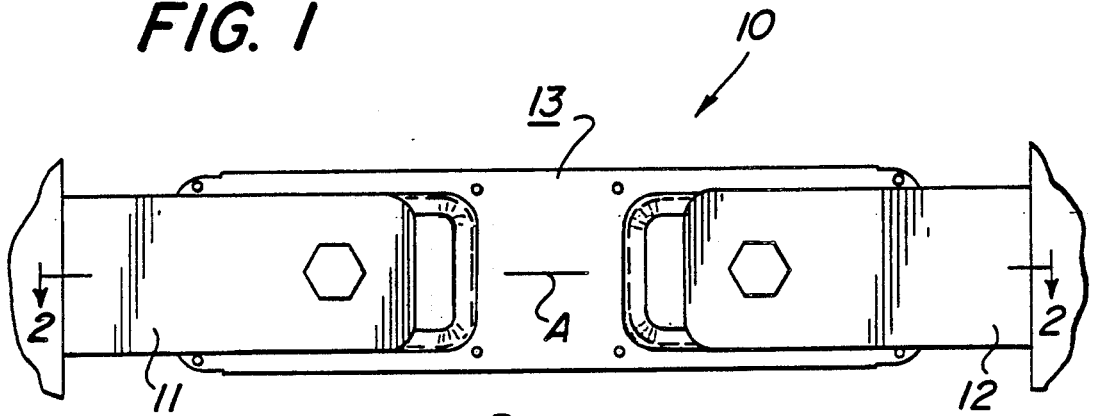
FIG. 1
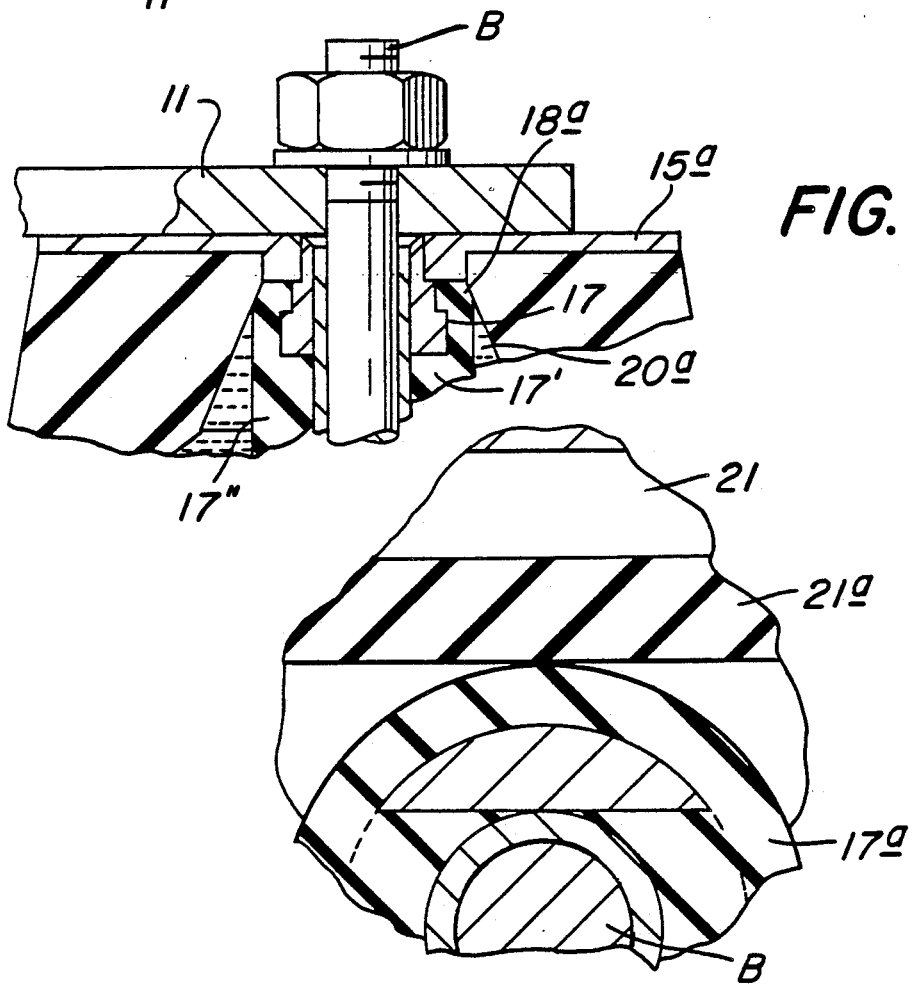
FIG. 2A
FIG. 4

FLUID-DAMPED STRUT

FIELD OF THE INVENTION

The present invention relates to elements for providing a damped tension and compression connection between spaced objects, and more particularly the present invention relates to fluid-filled motion-damping torque struts such as find particular utility in vehicles to counter engine torque.

BACKGROUND OF THE INVENTION

In many front wheel drive automobiles currently on the market, the engine is mounted transversely in the engine compartment and is customarily supported on mounts and connected to a frame component of the automobile by means of a so-called torque strut. The torque strut functions to control angular displacement of the engine, such as when output torque increases during acceleration, and during braking, while accommodating normal engine oscillations, such as when the engine is operating at idle.

Known torque struts include an elongate member mounting at opposite ends a pair of sleeved rubber bushings for receiving a connecting bolt. While such struts have been capable of performing the aforedescribed functions, they have certain limitations. For instance, the rubber bushings at the ends of the struts are prone to deterioration due to large motions across the bushings while subjected to the heat of the engine so that, after a period of time, the bushings crack and stiffen. As a result, the struts develop a proclivity for transmitting vibrations and noises to the frame and hence into the passenger compartment, particularly during acceleration of the automobile when the strut is subjected to substantial tensile loads.

Special struts have been proposed to overcome some of the aforementioned problems. An example of such a strut may be found in U.S. Pat. No. 4,392,640. The patented strut utilizes rubber bushings having specially shaped interior cavities for providing the desired motion accommodation. U.S. Pat. No. 4,518,058 discloses a damped anti-torque strut which utilizes an hydraulic fluid displaceable axially in a chamber by means of a piston spring loaded into a central position. U.S. Pat. No. 4,377,216 discloses a fluid-filled vibration damping bushing that can be used in automotive applications.

A strut representing an improvement over the aforementioned struts is disclosed in U.S. Pat. No. 4,706,946 issued to Lord Corporation, the assignee of the present application. It incorporates friction elements to provide a friction damping action.

While the aforementioned struts and bushings may function satisfactorily for their intended purposes, there is a need for a durable and relatively low-cost torque strut which limits the transmission of engine vibrations over a broad range of engine operating conditions while being capable of readily being designed and manufactured to meet a wide variety of requirements.

OBJECTS OF THE INVENTION

With the foregoing in mind, a primary object of the present invention is to provide a novel fluid-damped strut assembly which is particularly suited for providing both a tension and a compression connection between relatively movable objects while simultaneously providing motion damping.

Another object of the present invention is to provide an improved torque strut which utilizes fluid displacement to provide the desired degree of motion damping.

A further object of the present invention is to provide a unique torque strut which overcomes the limitations of known torque struts by accommodating relatively large displacements over a relatively long service life.

A still further object of the present invention is to provide a fluid-damped strut which damps axial motion over an extended range and gently arrests motion before extreme limits of excursion are reached.

SUMMARY OF THE INVENTION

More specifically, the present invention provides a strut which utilizes internal fluid displacement to damp motion between a pair of relatively movable objects connected to the strut. The strut includes a frame extending on an axis between the objects, and first and second attachment means for connecting the frame to the objects. At least one of the attachment means includes a pair of attachment plates disposed on opposite sides of the frame and connected thereto by a pair of elastomeric blocks which provide an elastic shear connection enabling the frame to move relative to the attachment plates. The elastomeric blocks have confronting recesses which are juxtaposed to form a fluid-filled chamber. A mounting sleeve extends through the chamber and is connected at opposite ends to the attachment plates for movement therewith relative to the chamber. The chamber is elongate on the axis of motion of the frame, and opposite axial ends of the chamber are interconnected by a discrete fluid conduit which substantially surrounds the attachment sleeve. Motion of the attachment sleeve in alternate directions relative to the chamber causes fluid to be displaced in alternate directions in the conduit to thereby provide a fluidic damping action. Inner walls of the elastomeric blocks are shaped to provide a progressive snubbing action as the strut approaches the limits of motion in tension and compression. Preferably, portions of the connecting sleeve are elastically deformable to enable the volume stiffness of the chamber to be controlled.

BRIEF DESCRIPTION OF THE DRAWINGS

The foregoing and other objects, features and advantages of the present invention should become apparent from the following description when taken in conjunction with the accompanying drawings, in which:

FIG. 1 is a side-elevational view of a strut embodying the present invention, the strut being illustrated connecting a pair of relatively movable spaced brackets;

FIG. 2A is a greatly enlarged fragmentary cross-sectional view of a portion of the strut of FIG. 2;

FIG. 4 is a greatly enlarged fragmentary sectional view of the region indicated within the broken lines indicated in FIG. 3.

DESCRIPTION OF THE PREFERRED EMBODIMENT

Figure 2:
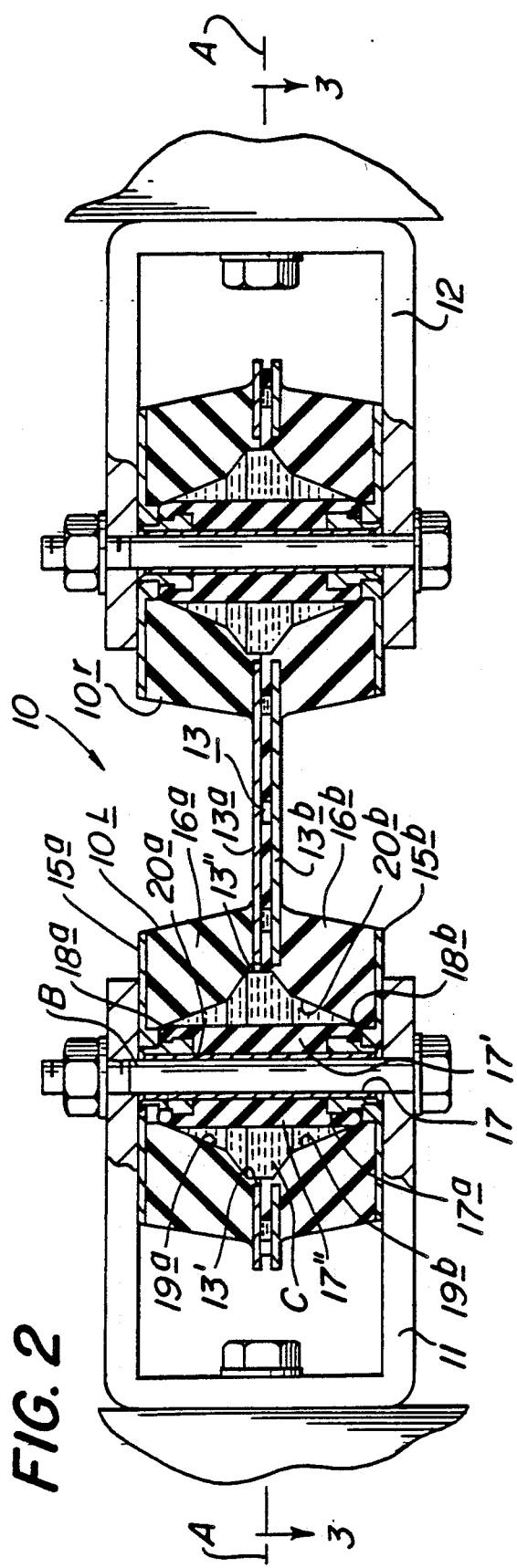
FIG. 2 is an enlarged longitudinal sectional view taken on line 2—2 of FIG. 1.

Referring now to the drawings, FIG. 1 illustrates a strut 10 which embodies the present invention. The strut 10 is shown connected to a pair of spaced objects, such as the spaced apart U-shaped brackets 11 and 12. The brackets 11 and 12 may be components of an automobile, such as engine and frame components when the strut 10 is used to counter engine torque in the manner described heretofore.

According to the present invention, the strut 10 connects the brackets 11 and 12 together in a manner permitting them to move axially toward and away from one another in a controlled manner. The strut 10 damps motion in opposite axial directions, gently arresting relative motion occurring within a predetermined range and snubbing motion occurring at the limits of the predetermined range.

To this end, the strut 10 has a flat, rigid, elongate rectangular frame 13 disposed on an axis A extending between the brackets 11 and 12. As best seen in FIG. 2, the frame 13 includes a pair of upper and lower frame elements 13a and 13b preferably of die-punched metal. The frame elements 13a and 13b are congruent and extend in closely spaced parallel relation to along the axis A. The frame elements 13a, 13b each have elongate apertures adjacent their opposite ends, such as the apertures 13', 13" in the upper frame element 13a. The frame elements 13a, 13b cooperate to provide a rigid frame 13, or skeleton capable of accepting both tensile and compressive loads.

The frame 13 is connected to the brackets 11 and 12 by means of identical elastic shear connections 10L and 10R. Accordingly, only one attachment will be discussed in detail, it being understood that a similar description applies to the other. In the illustrated embodiment, the elastic shear connection 10L between the frame 1 and the left hand bracket 11 is provided by a pair of upper and lower attachment plates 15a and 15b, respectively, and a pair of upper and lower molded elastomeric blocks 16a and 16b, respectively. The upper elastomeric block 16a is elongate on the A axis and is bonded to and between the upper attachment plate 15a and upper frame element 13a. The lower elastomeric block 16b is of like construction and is bonded to and between the lower attachment plate 15b and the lower frame element 13b.

Figure 3:
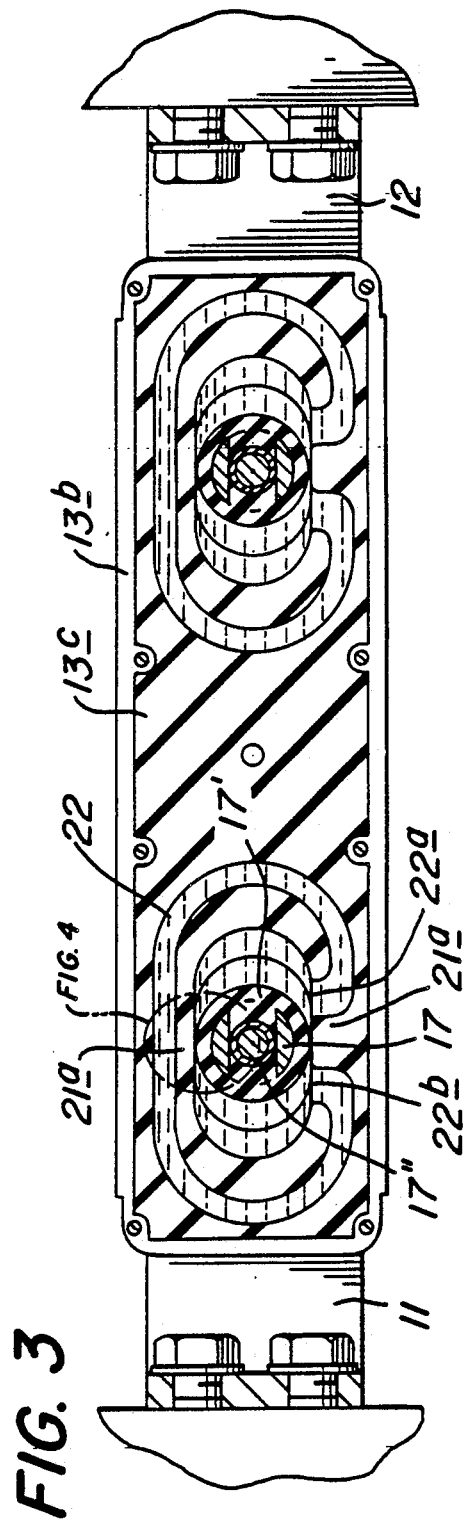
FIG. 3 is a sectional view taken on line 3—3 of FIG. 2.

In order to connect the attachment plates 15a and 15b to the bracket 11, an attachment sleeve 17 extends transversely of the frame 13 between the attachment plates 15a, 15b for receiving a connector bolt B. As best seen in FIGS. 2 and 3, the attachment sleeve 17 has a pair of diametrically opposite vertically elongate apertures 17', 17" facing in opposite directions on the axis A and extending transversely of the frame 13. The sleeve 17 has a tubular flexible bonded elastomeric outer wall end portion 17a which fills the apertures 17', 17" and bulbous end extensions 18a, 18b which sealingly engage against the inturned flanges provided on the upper and lower attachment plates 15a and 15b, respectively. See FIG. 2A. Opposite ends of the sleeve 17 are cylindrical and are suitably secured to the attachment plates 15a, 15b by means of an internal spacing sleeve to form a solid metal through connection.

The elastomeric blocks 16a and 16b cooperate with the bonded sleeve 17 to define a fluid-filled chamber C. As best seen in FIG. 2, the chamber C extends transversely of the frame 13, and as best seen in FIG. 3, the chamber C is elongated on the longitudinal axis A of the frame 13. The maximum longitudinal dimension of the chamber C is located substantially coplanar with the frame 13, and the minimum longitudinal dimensions are located adjacent the attachment plates 15a, 15b.

For purposes of defining the configuration of the chamber C and of providing a gentle snubbing action, each elastomeric block, such as the upper elastomeric block 16a, has a pair of angulated, tapered interior wall surfaces 19a and 20a located at axially opposite ends of the chamber C on opposite axial sides of the sleeve 17. Similar wall surfaces 19b, 20b are located on the lower elastomeric block 16b. Axially opposite end wall surfaces 19a and 19b are connected by parallel side walls 21a, 21a which extend axially in closely spaced relation with diametrically opposite lateral sides of the sleeve 17. See FIGS. 3 and 4. This enables the sleeve 17 to move axially in opposite directions relative to the frame 13, and hence the chamber C.

For purposes of enabling fluid to be displaced from one axial end portion of the chamber C to the opposite end portion, a conduit 22 is provided in the frame 13. As best seen in FIG. 3, the conduit 22 provides a discrete fluid flow path having a kidney-shaped plan configuration which extends clockwise from an orifice 22a around the sleeve 17 to communicate with the axially opposite end of the chamber C through an orifice 22b. The length and cross sectional area of the conduit 22, and the volume stiffness of the elastomer-filled apertures, determines the resonant frequency of the fluid mass contained within it, and thereby, determines the damping characteristics of the strut. Preferably, the conduit 22 is molded in a layer of elastomeric material 13c located on the upper surface of the lower frame element 13b, so that when the upper frame element 13a with its elastomeric block 16a is juxtaposed in overlying relation with the lower frame element 13b, a closed discrete fluid flow path is provided.

In the illustrated embodiment, the strut 10 is connected to the right hand bracket 12 by the same attachment means as described heretofore with respect to the bracket 11. There may, however, be installations which do not require both attachments to be of like construction. In such event, the right hand end of the strut 10 may be non-movably connected as by a simple bolt to the bracket 12, which may be adequate for those installations requiring less than all the motion accommodating advantages of the disclosed embodiment.

In operation, and with reference to the left hand bracket 11 and its attachment 10L, movement of the right hand bracket 12 axially rightward to tension the strut 10 causes the sleeve 17 to move leftward relative to the chamber C. This pressurizes fluid in the axial left hand end of the chamber C and displaces it through the orifice 22a into the conduit 22 and through the orifice 22b into the axially opposite end of the chamber C. In like manner, movement of the right hand bracket 12 axially toward the left hand bracket 11 causes fluid in the right hand portion of the chamber C to flow in the reverse direction through the conduit 22. At low frequencies and amplitudes, this damps relative motion between the brackets 11 and 12. In addition, the elastomeric blocks 16a, 16b cooperate with the fluid filled chamber C and connecting conduit 22 to provide a self-restoring action under substantially steady-state conditions. Under conditions of higher-amplitude tensile loading, as the right hand bracket 12 moves further away from the left hand bracket 11 as shown, the sleeve 17 begins to contact the upper and lower chamber walls 19a and 19b over increased distances, beginning adjacent the upper and lower attachment plates 15a and 15b and progressing toward the plane of the frame 13, to provide an increasing snubbing action as motion progresses. The same type of snubbing action occurs in the opposite axial direction, i.e. when the right hand bracket 12 moves axially leftward toward the left hand bracket 11. The ultimate limits of motion are reached as the sleeve 17 approaches the axial end edges of the apertures in the frame 13.

The essentially shear-type connection between the attachment plates and the frame enables substantial motion between the brackets 11 and 12 to be accommodated while providing desirable damping action as a result of the fluid pumping that occurs. The dynamic operating characteristics of the strut 10 can be determined to some extent by varying the clearance between the side walls 21a and the sleeve 17 (FIG. 4) and by varying the volume stiffness of the chamber C, as by adjusting the flexibility of the flexible portion 17' and 17" of the sleeve 17. Moreover, both the length of the conduit 22 and its area can be designed to obtain certain desirable damping characteristics within particular frequency ranges.

Possible modifications of the illustrated embodiment include lengthening of the fluid conduit 22, as by forming complementary helical portions in the upper and lower elastomeric block 16a and 16b. Also, amplitude sensitive damping can be effected by providing a decoupler, such as a diaphragm or check valved path connected directly between the fluid conduit ports 22a and 22b in fluid parallel relation with the conduit 22. A diaphragm section, which flexes against atmospheric pressure, could also be laterally connected to the fluid conduit 22.

The present invention provides a number of advantages. By way of example, the elastic shear connection between the rigid frame and the attachment plates, enables relatively large motions to be accommodated repeatedly with minimal fatigue, because the elastomeric material is stressed primarily in shear. The strut 10 is bi-directionally active, i.e. accommodates axial tension and compression loads and endwise relative motion. The strut 10 can be designed to provide desirable frequency responsive dynamic operating characteristics. From a manufacturing standpoint, the strut 10 can be molded in complementary sections which can be permanently fastened together at spaced peripheral locations by fasteners, such as spot welds, rivets, etc. This enables manufacturing economies to be realized, and it also enables operating characteristics to be modified readily to suit particular applications because changes in the size and shape of the fluid cavities can be regulated simply by adjusting the shapes of the mold cavities used. Furthermore, the strut 10 has a relatively long service life because the elastomeric material is normally stressed primarily in shear.

While a preferred embodiment of the present invention has been described in detail, various modifications, alterations and changes may be made without departing from the spirit and scope of the present invention as defined in the appended claims.

I claim:

1. A fluid filled strut for use in providing a motion-damped connection between objects movable relative to one another, comprising:

a frame adapted to be disposed on an axis extending between said objects, means for connecting one of said objects to said frame, attachment means located on opposite sides of said frame in spaced relation therewith for providing a connection to the other of said objects, elastomeric means providing an elastic shear connection between said attachment means and said frame for permitting said frame to move relative to said attachment means, said elastomeric means having interior walls extending laterally along opposite sides of said attachment means and defining a fluid-filled chamber extending transversely of said frame, a sleeve extending through said chamber transversely across said frame for connecting said attachment means and for receiving a connector, conduit means providing a discrete fluid flow path extending between said chamber on one axial side of said sleeve and said chamber on the opposite axial side of said sleeve, said chamber being elongated in the axial direction of said frame and having opposed working portions on opposite axial sides of said sleeve and opposed sealing portions on opposite lateral sides of said sleeve slidable along said sleeve in closely spaced relation therewith, said frame cooperating with said attachment means, said connecting sleeve, and said elastomeric means to cause the sleeve to slide relative to the lateral sealing portions and fluid to be displaced in alternate directions through said conduit means in response to alternating axial tension and compression of the frame, whereby motion between connected objects can be damped.

2. A strut according to claim 1 wherein said chamber walls have side portions extending in spaced parallel relation on opposite sides of said sleeve in closely spaced relation with said sleeve, whereby the sleeve can slide relative to said side wall portions for displacing fluid in the chamber.

3. A strut according to claim 1 wherein said chamber wall tapers on opposite axial sides of said sleeve from a maximum dimension substantially centrally of said frame to minimum dimensions adjacent to said attachment means, whereby snubbing of the sleeve proceeds progressively inward from the attachment means toward the frame.

4. A strut according to claim 1 wherein said sleeve has elastically deformable flexible wall portions confronting axially opposite end portions of said chamber for regulating certain dynamic operating characteristics of the strut.

5. A strut according to claim 1 wherein said elastomeric means includes a pair of blocks of elastomeric material bonded to opposite sides of said frame and having juxtaposed recesses confronting one another to define said chamber therebetween.

6. A strut according to claim 1 wherein said attachment means includes a pair of plates bonded to said elastomeric means and sealingly connected to opposite ends of said sleeve.

7. A strut according to claim 1 wherein said conduit means is disposed in the plane of said frame and substantially completely surrounds said chamber to define an elongated fluid flow path.

8. A strut according to claim 1 wherein said frame is elongate and said means for connecting said one object is substantially identical to the means by which said other object is connected.

9. A fluid filled strut for use in providing a motion-damped connection between objects movable relative to one another comprising:

an elongate frame adapted to be disposed on an axis extending between said objects, first means for connecting one of said objects to said frame, second means for connecting the other of said objects to said frame, said second means including:

a pair of mounting attachment plates located on opposite sides of said frame in spaced relation therewith for providing a connection to said other one of said objects, a sleeve connecting said attachment plates and extending across said frame for receiving a connector, a pair of elastomeric blocks providing an elastic shear connection between said mounting attachment plates and said frame for permitting said frame to move relative to said mounting attachment plates, said blocks having interior walls defining recesses juxtaposed on opposite sides of said frame to define a fluid-filled axially elongate chamber extending transversely of said frame, said walls having axially opposite ends tapering toward said sleeve from a location adjacent said frame to provide progressive snubbing in opposite axial directions, said walls also having parallel lateral side portions connecting said axially opposite ends, said parallel lateral side wall portions extending in closely spaced relation with said sleeve and slidable along said sleeve to minimize dynamic fluid flow there between, conduit means providing a discrete fluid flow path between said chamber on one side of said sleeve and said chamber on an opposite side of said sleeve, said frame cooperating with said mounting attachment plates, said connecting sleeve, and said elastomeric blocks to cause fluid to be displaced in alternate directions through said conduit means in response to alternating tension and compression of the frame, whereby motion between connected objects can be damped.

10. A strut according to claim 9 wherein said sleeve has flexible elastically deformable wall portions for regulating the volume stiffness of said chamber.

11. A strut according to claim 9 wherein said conduit means includes a continuous elongated channel substantially entirely surrounding said sleeve.

12. A strut according to claim 9 wherein said first and second connecting means are of like construction and are spaced apart axially on said frame.

13. A strut according to claim 9 wherein said chamber is elongated in the direction of said axis and has a maximum dimension in substantially the region of said frame.

14. A fluid filled strut for use in providing a motion-damped connection between objects movable relative to one another, comprising:

an elongate frame adapted to be disposed on an axis extending between said objects, first means for connecting one of said objects to said frame, second means for connecting the other one of said objects to said frame, said second connecting means including:

a pair of mounting attachment plates located on opposite sides of said frame in spaced relation therewith for providing a connection to said other one of said objects, a pair of elastomeric blocks on opposite sides of said frame providing an elastic shear connection between said mounting attachment plates and said frame for permitting said frame to move axially to said mounting attachment plates, said blocks having interior walls defining recesses juxtaposed on opposite sides of said frame to define a fluid-filled chamber extending transversely of said frame, said walls having end portions tapering toward said plates from a location adjacent said frame to provide said chamber with a maximum dimension in the region of said frame and to provide progressive snubbing in opposite axial directions of said frame said walls also having parallel lateral side portions connecting said end portions to form said chamber with an elongate configuration in the direction of said frame axis, a sleeve connecting said attachment plates and extending through said chamber across said frame for receiving a connector, said sleeve being slidable along said lateral side portion of said walls in closely spaced relation therewith, conduit means providing a discrete fluid flow path extending axially of said frame between said chamber on one axial side of said sleeve and said chamber on the other axial side of said sleeve, said conduit means extending at least partially around said sleeve in the region of said frame, said frame cooperating with said mounting plates, said connecting sleeve, and said elastomeric blocks to cause fluid to be displaced in alternate directions through said conduit means in response to alternating tension and compression of the frame, whereby motion between connected objects can be damped.

* * * * *